United States Patent [19]

Beemer

[11] Patent Number: 4,461,335
[45] Date of Patent: Jul. 24, 1984

[54] TIRE CHANGING HAND TOOL

[76] Inventor: Jerry L. Beemer, 2314 Eby Ave., Fort Wayne, Ind. 46804

[21] Appl. No.: 408,157

[22] Filed: Aug. 16, 1982

[51] Int. Cl.$^3$ ............................................. B60C 25/08
[52] U.S. Cl. ..................................... 157/1.22; 157/1.3
[58] Field of Search ...................... 157/1.17, 1.22, 1.3, 157/1.24, 1.26, 1.28, 1.1

[56] References Cited

U.S. PATENT DOCUMENTS

| | | | |
|---|---|---|---|
| 2,808,860 | 10/1957 | Hildebrant | 157/1.26 X |
| 2,978,017 | 4/1961 | Schultz et al. | 157/1.26 |
| 3,771,581 | 11/1973 | Johnson | 157/1.3 X |
| 4,360,052 | 11/1982 | Norris | 157/1.3 |

*Primary Examiner*—James G. Smith
*Attorney, Agent, or Firm*—Rodger H. Flagg

[57] ABSTRACT

An improved tire changing hand tool intended for use with rim mounted tubed or tubeless tires, and adapted for mounting to a suitable base. Apparatus includes a center post; a tubular bracket with rim-engaging flange; a rotatable arm; an extended foot; and an elongated handle adapted for attachment to the arm and foot. The centerpost is secured to a suitable base, the tire rim positioned over the center post in a manner to center and secure the tire rim against the base in preparation for tire repair or replacement. With arm and foot attached to the handle, the arm is slidably engaged about the tubular bracket, the foot is positioned against the tire side in close proximity to the rim circumference, and the handle is forced downward to break the seal between the tire bead and the inner lip of the rim. With arm and foot removed, a flat on the axial end of the handle is used to raise and remove the tire bead from the rim by biasing the handle against the tubular bracket, and rotatably biasing the handle about the rim. A curved extension near the axis end of the handle aids insertion of the tire bead into the rim. An inflation member partially secured to the base in proximity to the adjacent tire side, is inflated to bias the tire away from the base to seat the upper tire bead in relation to the upper tire rim in preparation for inflation of a tubeless tire.

9 Claims, 5 Drawing Figures

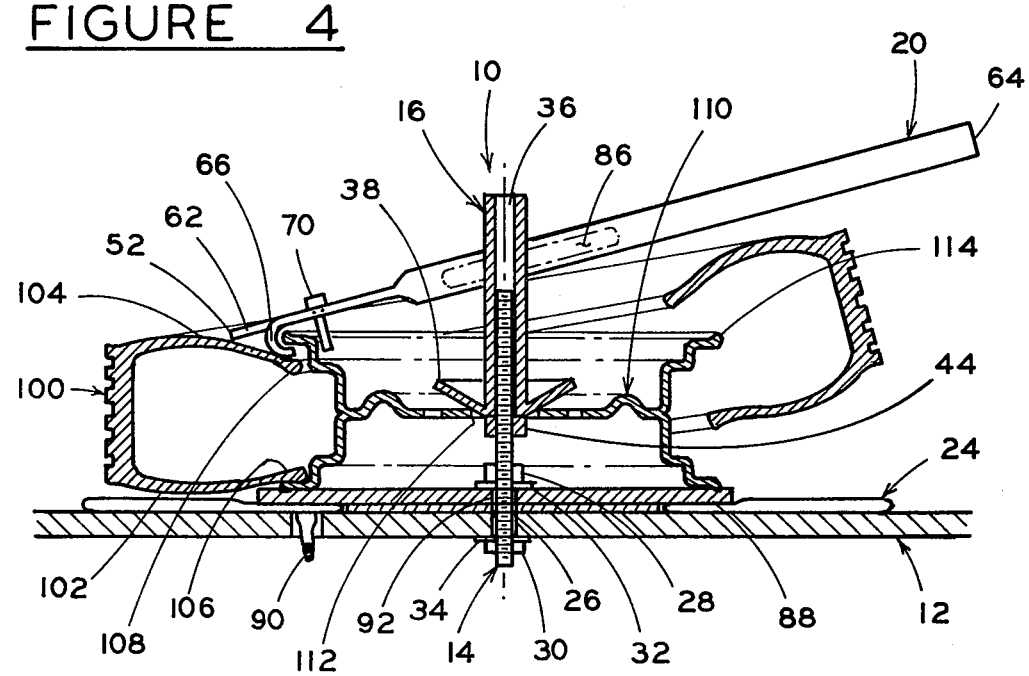
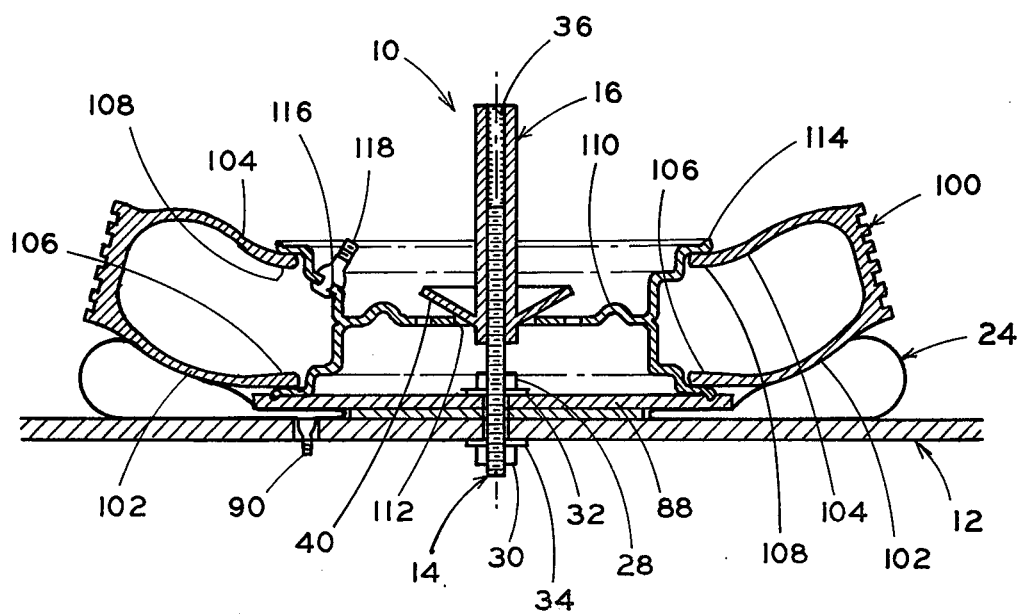

TIRE CHANGING HAND TOOL

BACKGROUND OF THE INVENTION

This invention relates to tire changing tools, more specifically to hand operated tire changing tools used to mount and dismount a tubed or tubeless tire upon a suitable rim, for ease of repair or replacement.

Present tire changing tools, particularly tire changing tools adapted for use on tubeless automobile tires, are heavy, bulky, expensive and designed primarily for use in professional automotive garages, service stations, and the like. The weight, bulk and expense of these tire changing tools, inhibit their use in a home garage or shop, by an average automobile owner, who wishes to repair or replace his own tires. Without the help of a suitable tire changing tool, it is extremely difficult to mount or dismount a tubless tire from its rim. The average automotive owner is therefore forced to take his tire to a professional shop for repair or replacement. At current labor prices, the automotive owner may save enough by repairing his own tires to justify the expense of a compact, portable, inexpensive tire changing tool.

Therefore, what is needed is a compact, portable, inexpensive tire changing tool, suitable for home-shop use, that has relatively few parts, is easy to use, and is adapted to both mount and dismount a tubed or tubeless tire.

One object of the present invention is to provide a novel hand operated tire changing tool for mounting and dismounting a tubed or tubeless tire from its rim.

Another object is to adapt the tire changing tool handle with detachable arm and foot positioned to obtain suitable force to break the tire bead seal from the rim in preparation for removal of the tire from the rim.

Another object is to adapt the tire changing handle with a flat on the axis end to aid removal of the tire from the rim.

Yet another object is provide a curved extension near the axis end of the handle to aid installation of the tire within the rim.

Yet another object is provided a flat on the handle approximately perpendicular to the flat on the axis end of the handle to resist twisting during tire mounting or removal as the handle is biased against the tublar bracket for leverage.

Still another object of the present invention is to provide an inflatable member adapted for securement between the base and the tire, which when inflated, presses against the adjacent tire wall, biasing the tire away from the base to seat the tire bead on the opposite tire wall against the rim to form a seal in preparation for inflation of a tubeless tire.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a cross sectional view showing the handle positioned to seat the tire bead within the rim circumference.

FIG. 5 is a cross sectional view showing inflation member inflatably positioned to bias the adjacent tire side away from the base, thereby flexing the tire in a manner to seat the opposite tire bead against the rim in preparation for inflating a tubeless tire.

DESCRIPTION OF THE PREFERRED EMBODIMENT(S)

The subject matter which I regard as my invention is particularly pointed out and distinctly claimed in the claims. The structure and operation of my invention, together with further objects and advantages, may be better understood from the following description given in connection with the accompanying drawings.

Figure 1:
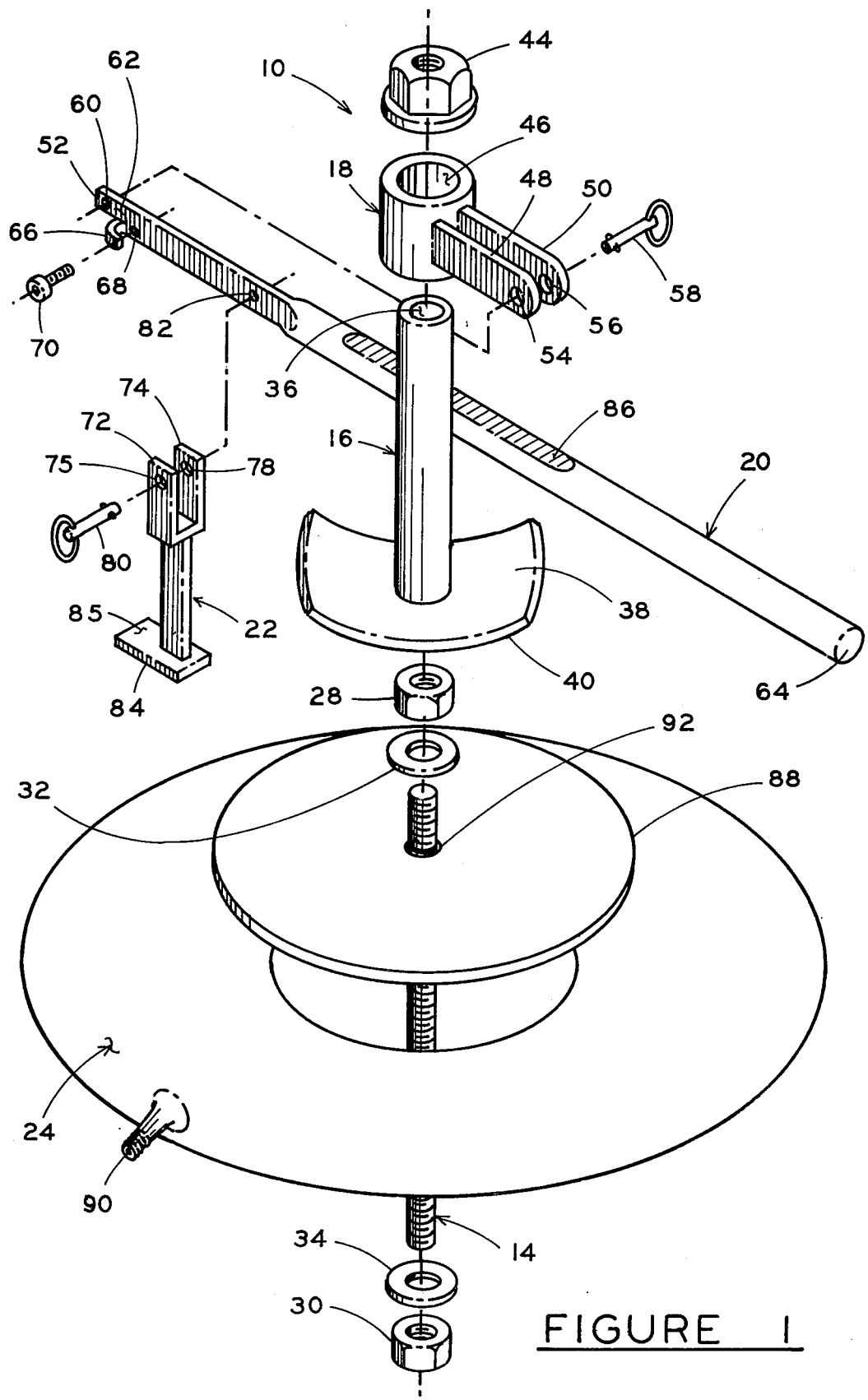
FIG. 1 is an isometric exploded view of one embodiment of the preferred invention.

FIG. 1 shows the improved tire changing tool 10 in exploded view with center post 14, tubular bracket 16, rotatable arm 18, elognated handle 20, extended foot 22, and inflation member 24, positioned for assembly to base 12.

Base 12 should be sufficiently strong to support the improved tire changing tool 10 during use. Base 12 may be adapted with an aperature 26, suitable for receivably securing center post 14, such as with nuts 28, 30 and washers 32, 34 as shown. Center post 14 may be threaded as shown, or adapted for securement to base 12 by a bracket or other conventional means (not shown).

Tubular bracket 16 is adapted with an internal aperature 36 therethrough. A rim engaging flange 38 is adapted to slope up and away from base 12 to form an inclined rim engaging surface 40, as shown. Flange 38 is preferably sized to engage and secure a variety of conventional rim center opening sizes. Inclined surface 40 acts against the center opening of the rim 112 to center and secure the rim 110 against base 12 in relation to center post 14, as tubular bracket 16 is biased against the rim. To obtain the advantages of centering the rim as bracket 16 is biased against the rim, and to accomodate a variety of rim sizes, inclined surface 40 should be inclined from 10 degrees to 45 degrees from tangent with relation to aperature 36. A 45 degree incline will exert approximately equal forces downward and outward against the center opening of the rim. A 30 degree incline will exert approximately twice the force downward as exerted outward against the rim. Since less force is required to center the rim than to secure the rim against rotation during use, a 15 degree to 35 degree incline is preferred. Where additional protection against rotation during use is desired, especially where inclined surface 40 is greater than 35 degrees, a bolt or pin 42 may be adapted to extend from one of the rim mounting holes for securement to base 12. See FIG. 2. Where a variety of rim sizes are anticipated, bolt or pin 42 should be adjustably positioned to adapt to different rim sizes and hole configurations.

Figure 2:
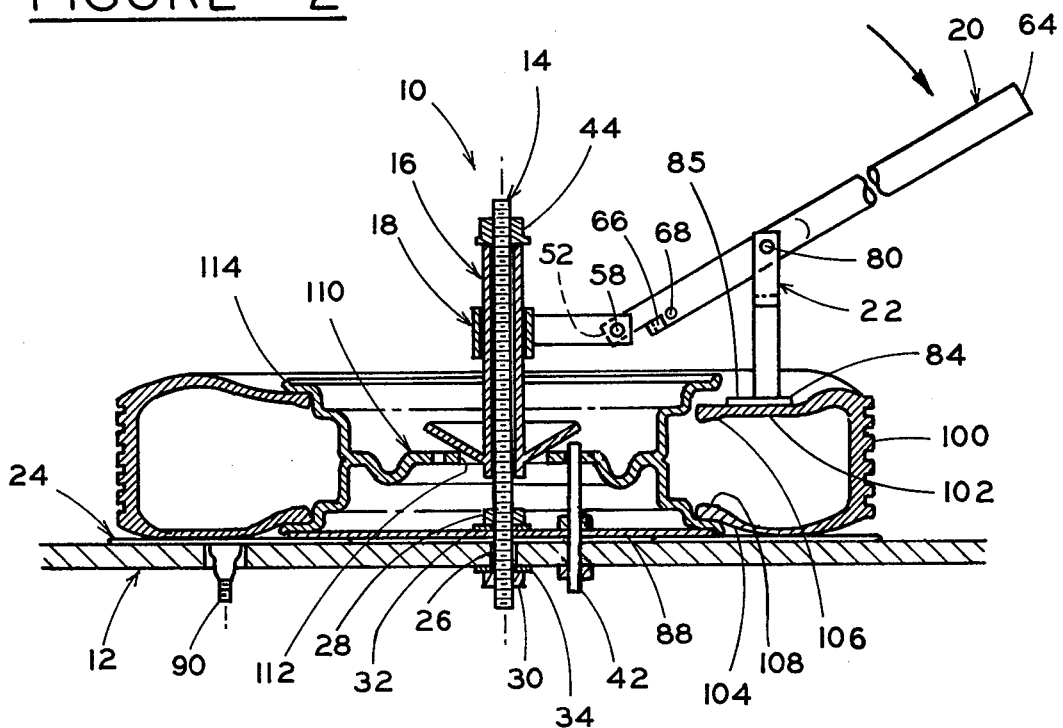
FIG. 2 is a cross-sectional view showing the arm and foot pivotally attached to the handle, and positioned to break the tire bead from the rim.
Figure 3:
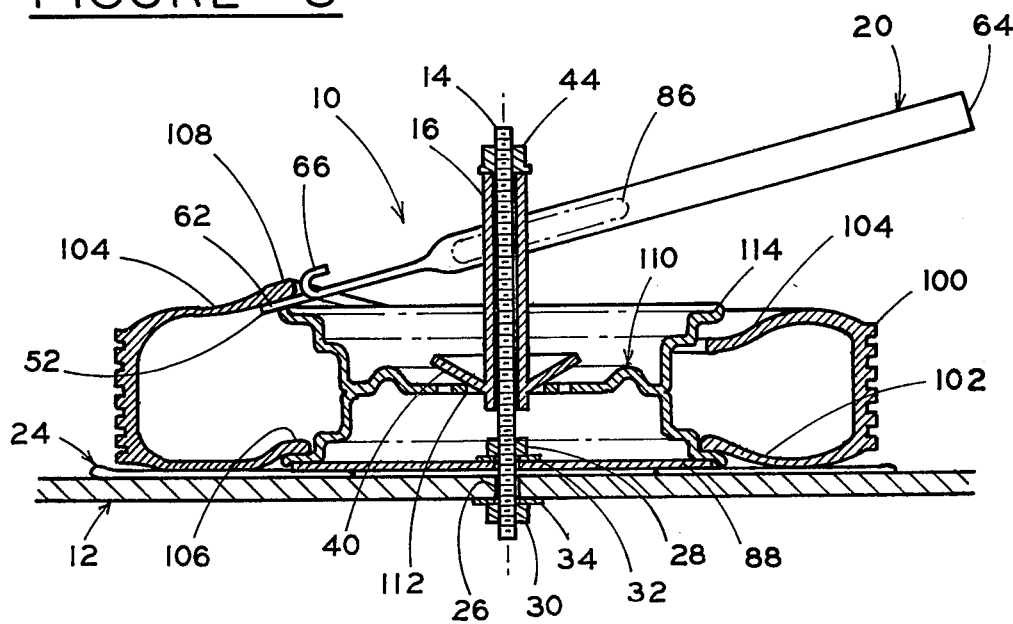
FIG. 3 is a cross sectional view showing the handle, with arm and foot removed, positioned to raise the tire bead above the rim.

A nut 44 may be adapted to threadably engage center post 14 to bias tubular bracket 16 towards base 12 to secure the rim prior to use. Nut 44 may be secured to tubular bracket 16 in a manner to effect rotation of bracket 16 as nut 44 is rotatably biased towards base 12, as shown in FIG. 4. However, once inclined surface 40 engages the rim, considerable torqueing effort will be lost through frictional rotational engagement of rotating inclined surface 40 and the non-rotating rim. Therefore, in the preferred embodiment, Nut 44 is adapted to threadably engage center post 14 in a manner to non-rotatably bias tubular bracket 16 towards base 12, as shown in FIGS. 1, 2 and 3. Aperature 36 may be adapted to threadably engage center post 14 as shown in FIG. 5.

Rotatable arm 18, has an aperature 46 therethrough, sized to freely slide about at least a portion of tubular bracket 16. Tubular bracket 16 should be closely recieved within aperature 46 to insure a locking action as arm 18 is cocked as attached handle 20 is pivoted downward against extended foot 22 to break the bead seal of the tire against the rim. In the preferred embodiment, arm 18 should have sufficient linear adjustment about tubular bracket 16 to incline handle 20 from 10° to 45° above the rim as the extended foot 22 is positioned against the tire side near the edge of the rim, for each of the anticipated rim sizes. The length of aperature 46 is preferably from one to two times the diameter of aperature 46 to obtain the desired cocking action, and to avoid slippage of arm 18 about bracket 16 as pressure is exerted on attached handle 20 against foot 22.

Rotatable arm 18 is adapted with extensions 48, 50 to receive and pivotally attach axis end 52 of handle 20. In the preferred embodiment, aperatures 54, 56 in extensions 48, 50 are adapted to receive a removable pin or fastener 58 therethrough, to removably attach axis end 52 of handle 20 through a suitable aperature 60 in handle 20.

Handle 20 has an axis end 52, and a handle end 64. Axis end 52 is preferably flattened 62 or provided with a flat profile cross-section so that when unattached from arm 18, the flattened axis end 52 of handle 20 may be used to separate the tire from the rim, as shown in FIG. 3. In the preferred embodiment, the axis end 52 should not be more than 5/16 inches (0.312) thick to facilitate its use as a tire bead removal tool.

A curved extension 66 may be adapted to aid insertion of the tire bead within the rim, as shown in FIG. 4. Curved extension 66 should be sized to engage the tire rim lip for ease of mounting the tire within the rim, as handle 20 is rotatably biased against tubular bracket 16. To aid alignment of curved extension 66 along the circumference of the tire rim, aperature 68 may be adapted to receive pin or fastener 70. Aperature 68 should be positioned to align pin 70 against the outer rim lip as curved extension 66 seats the tire bead about the rim circumference. Pin or fastener 58 may be adapted for use through aperature 68, eliminating the need for a separate component part 70. Curved extension 66 also aids removal of tire bead from rim, as shown in FIG. 3, by limiting the depth of insertion of flat 62 between tire and rim.

As shown in FIG. 1, extended foot 22 is adapted with extensions 72, 74 to receive and pivotally attach handle 20. In the preferred embodiment, aperatures 75, 78 in extensions 72, 74 are adapted to receive removable pin or fastener 80 therethrough, to selectively attach handle 20 through a suitable aperature 82 in handle 20.

Aperature 82 is located on handle 20 so that when arm 18 and foot 22 are attached, foot 22 may be positioned along tire side in close proximity to the rim circumference, with handle 20 raised from 10 to 45 degrees, in preparation for breaking the bead from the rim. A single aperature 82 is sufficient to positon foot 22 to accomodate most conventional automotive tire sizes, as different relative spacing is obtained by positioning rotatable arm 18 higher or lower along tubular bracket 16. However, additional aperatures may be provided within the scope of this invention to reduce the length of adjustment of arm 18 or to more narrowly position the angle of handle 20.

Extended foot 22 has a base 84 secured to extentions 72, 74. Base 84 has a toe segment 85 extending towards the axial end of foot 22. Base 84 is located approximately tangent to extensions 72, 74 and positioned to engage the side of the tire in close proximity to the outer rim circumference as handle 20 is lowered; biasing base 84 against the tire side to break the tire seal from the rim. Toe segment 85 may be tapped to force segment 85 between the rim and tire bead, to more easily break the seal between the tire bead and the rim. Upon breaking the tire seal from the rim, the handle 20 is raised and rotated to reposition the foot 22 in preparation for the next cycle. The procedure is repeated until the seal is broken around the entire rim circumference.

As shown in FIG. 1, a flat 86 may be provided along handle 20 perpendicular to flat 62 on axis end 52, and adjacent to tubular bracket 16, to resist handle twist, as axis end is inserted between the loosened tire bead and the rim, and the handle 20 biased against the tubular bracket 16 for leverage. Flat 86 should be sized to ensure alignment of flat 86 against tubular bracket 16, as handle 20 is rotated about a variety of rim sizes normally encountered.

As shown in FIG. 5, an inflatable member 24, preferably sized to inflatably contact the adjacent side of a variety of tires to be changed, is secured against the base with retaining plate 88. An inflation valve 90 is adapted for ease of access to provide inflation or deflation of the inflatable member from an external source such as a hand or foot pump or other remote air pressure source (not shown). A conventional innertube may be adapted for use as inflatable member 24, providing access is provided to valve 90 through the base 12. The retaining plate 88 may be adapted to receive center post 14 through aperature 92 for securement to base 12 with nuts 28, 30 as previously disclosed. Retaining plate 88 should partially overlap inflatable member 24, to retain member 24 in position during use.

When inflated, member 24 expands against base 12, and adjacent tire side 102, biasing adjacent tire side 102 upward away from base 12, which in turn flexes the opposite tire side 104 upward against inner side of the rim 110, seating the tire bead 108 against the rim 110 in preparation for tire inflation.

OPERATION OF THE PREFERRED INVENTION

The improved tire changing tool herein disclosed, is suitable for sale in kit form, for installation and assembly at the point of use. The center post 14 is securely mounted to a suitable base 12, such as a shop workbench, sturdy stand, or the like, as previously disclosed. Inflation means 24 is centered about centerpost 14 and retaining plate 88 positioned to partially secure inflation means 24 in a manner to provide contact of the unsecured portion of the inflation means with the adjacent tire side during use.

The tire 100 and rim 110 to be repaired or replaced is relieved of air, if any is present, and placed narrow side down over centerpost 14 against base 12. Tubular bracket 16 is placed over centerpost 14, and bracket 16 is tightened to bias rim engaging flange 38 against the center aperature 112 of rim 110. As bracket 16 is tightened, the inclined slope 40 of flange 38 serves to center the rim about center post 14, until opposing engagement is made between flange 38 and rim aperature 112. Additional tightening of nut 16 provides securement of rim 110 against base 12 to resist rotational movement of rim 110 during repair or replacement of the tire. Soap, or other suitable lubricating agent may be used to aid removal of the tire 100 from the rim 110.

As shown in FIG. 2, arm 18 and foot 22 are pivotally attached to handle 20 as previously disclosed, and aperature 46 slidably positioned about a portion of tubular bracket 16. Base 84 of extended foot 22 is positioned upon tire side 102 in close proximity to outer rim circumference 114, foot 22 is tapped to interpose base 85 between tire bead 106 and rim 110, and handle 20 forcibly lowered to break the seal between tire bead 106 and rim 110. Base 84 is repositioned, and handle 20 is forcibly lowered until the seal is broken about the entire rim circumference.

Nut 44 is loosened, and tubular bracket 16 is removed from centerpost 14 so that rim may be turned narrow side up and resecured as previously disclosed. Once rim 110 is resecured against base 12 by rim engaging flange 38, handle 20, with arm 18 and foot 22 attached, is again used as previously disclosed to break the seal between the tire bead 108 and the rim on the opposite tire side 104.

Once the tire bead has been broken from the rim about the entire rim circumference, the arm 18 and foot 22 attachments are removed from handle 20. Narrow axis end 62 of handle 20 is inserted between tire bead and rim, and handle 20 is lowered and rotatably biased against tubular bracket 16, to raise tire bead 108 above rim 110. See FIG. 3.

On tubed tires, once the tire bead has been raised above the rim, the innertube may be removed by pulling the innertube through the opening between the tire and the rim. To completely remove the tire from the rim, the narrow axis end 62 of handle 20 is inserted between the lower tire bead 106, and the upper edge of the rim 110, and handle 20 is rotatably biased against tubular bracket 16 as previously disclosed, until the tire 100 is completely free of the rim 110.

Tire 100 may now be easily repaired or replaced.

To mount a tire on a rim secured to base 12, the curved extension 66 near axis end 52 of handle 20 is positioned to engage the outer rim circumference as shown in FIG. 4. A portion of the lower tire bead 106 is held below the lip of the rim prior to handle 20 rotation. Handle 20 is then rotatably biased against tubular bracket 16 to position the lower tire bead 106 within the rim.

Twist the tire about rim to set the upper tire bead 102 within the rim. Engage curved extension 66 about rim circumference and rotate handle 20 as previously disclosed to position tire lip 108 within rim circumference. Lower tire bed 106 should seat against lower rim lip. If additional force is required to seat lower tire bead 106 against 110, arm 18 and foot 22 may then be attached to handle 20 as previously disclosed, and aperature 46 slidably positioned about a portion of tubular bracket 16, and foot 84 positioned upon upper tire side 104 in close proximity to rim circumference 114. Handle 20 is then forcibly lowered forcing tire side 104 against tire side 102 to seat the lower tire bead against lower rim lip. Tire innertube (where used) may be inserted between upper tire lip and upper rim circumference, and innertube valve 118 positioned in opening 116 provided in rim 110.

Air under pressure is then supplied through valve 90 from remote air pressure means, to expand inflation member 24. See FIG. 5. The unsecured portion of inflation member 24 expands between base 12 and adjacent tire side 102, flexing the tire upward, raising the upper tire bead 108 against the upper rim lip sufficiently to allow normal tire inflation through rim inflation valve 118 to fully seat and seal the tire within the rim. Required air inflation pressure within inflation member 24 is low, usually less than 10 p.s.i. and should not be great enough to unseat the lower tire bead 106 from the lower rim lip.

Therefore, while the invention has been described with reference to a particular embodiment, it is to be understood that modifications may be made without departing from the spirit of the invention or from the scope of the claims.

What I claim as new and desire to secure by Letters Patent of the United States is:

1. An apparatus suitable for mounting and dismounting a tubed or tubeless tire and rim, said apparatus adapted for securement to a suitable base, wherein the apparatus comprises:
   (a) a center post adapted for securement to the base;
   (b) a tubular bracket with a first aperature sized to receive a portion of the center post therethrough, said bracket having an inclined, rim engaging flange inclined away from said base when in use;
   (c) a means to forcibly bias the rim engaging flange of the tubular bracket against the rim towards the base about said center post;
   (d) a rotatable arm with a second aperature therethrough, said second aperature positioned to be in sliding alignment about a portion of said tubular bracket;
   (e) an elongated handle with an axis end having an elongated flat thereon, with said handle pivotally attached near the axis end to said rotatable arm;
   (f) an extended foot, removably, pivotally attached to said handle, said foot having a base positioned to engage the tire side in proximity to the rim circumference when used; and
   (g) an inflatable member, partially secured to the base about the center post, said inflatable member having an inflation valve, and sized to bias the tire side away from the base as said inflation member is inflated with a pressure sufficient to seat the tire bead against the rim in preparation for tire inflation;
   wherein the rotatable arm and extended foot may be unattached from said handle, and the narrow flat axis end of the handle interposed between the tire and the rim to remove the tire from the rim by rotatably biasing the handle against the tubular bracket.

2. The apparatus of claim 1, wherein the handle has a curved extension near the axis end of said handle; said curved extension of a size sufficient to engage the outer rim circumference while biasing the handle against the tubular bracket to aid in mounting the tire within the rim.

3. The apparatus of claim 2, wherein a third aperature is positioned in relation to the curved extension upon the handle, said third aperature positioned to receive a pin positioned to engage the rim lip to guide the curved extension about the tire rim as the handle is rotatably biased about the tubular bracket.

4. The apparatus of claim 1, wherein the width of the elongated flat at the axis end of the handle is sized to not exceed 5/16th (0.312) of an inch.

5. The apparatus of claim 1, wherein the handle has a flat surface perpendicular to the elongated flat on the axis end of said handle, said flat surface positioned to contact the tubular bracket as the handle is rotatably biased against the tubular bracket to resist twisting the handle during rotation about the tubular bracket.

6. The apparatus of claim 1, wherein the inclined rim engaging flange of the tubular bracket is inclined away from the base from 15 degrees to 35 degrees from perpendicular with relation to said first aperature.

7. The apparatus of claim 1, wherein the second aperature of the rotatable arm is of a length from one to two times the width of the second aperature, to assist locking engagement against sliding movement as the handle is pivotably biased about the rotatable arm.

8. The apparatus of claim 1, wherein a rim retaining member extends from the base to engage an existing mounting aperature in the rim, to resist rim rotation during tire mounting and dismounting.

9. The apparatus of claim 1, wherein the component parts are sized for use with a variety of rim and tire sizes.

* * * * *